Patented Dec. 9, 1941

2,265,773

UNITED STATES PATENT OFFICE 2,265,773

DRILLING MUD

James F. Larkin, Oklahoma City, Okla.

No Drawing. Application June 7, 1938,
Serial No. 212,387

4 Claims. (Cl. 252—8.5)

This invention relates to the compounding of drilling mud for use in drilling wells, especially oil and gas wells.

The principal object of this invention is to compound a drilling mud that is mobile enough to freely enter into the circulation of the well and also so heavy that the hydrostatic pressure produced by it in the well shall be great enough to counterbalance any pressure from the formations through which the well passes.

Another object of the invention is to prepare a mud which has viscosity enough to enable it to carry fragments set free by the drill to the surface.

Another object is to prepare a mud which shall not be affected chemically by substances encountered in the earth.

Another object of the invention is to prepare a mud which will not settle and thereby freeze the tools in the well, thereby preventing their removal or sometimes their use.

Other objects of the invention will in part be obvious and will in part appear hereinafter.

The invention accordingly comprises a composition of matter possessing the characteristics, properties and relation of components which will be exemplified in the composition hereinafter described, and the scope of the invention will be indicated in the claims.

In the known art of drilling mud compounding, clays of various nature are used and various substances are mixed with them without thought or care for the chemical reaction they undergo and the physical changes produced by means of substances found in the strata which the well may pierce or which they cause in such strata.

For example, some drilling muds contain large quantities of substances which are added to clay because their high specific density increases the hydrostatic pressure of the mud.

But many of these materials react chemically with substances in the earth. If sulfurous acid, for instance, is encountered such substances become entirely worthless.

Also if alkaline matter be met with, such substances gel or coagulate. Cement is always used in drilling, and always contains lime, and contact between these materials and this substance quickly causes a gel to form which stops circulation and soon freezes the well.

It is sometimes necessary to abandon the pipe and tools because of this "freezing."

Wells frequently pass through strata of calcareous material such as limestone or of, say, sandstone cemented with limestone or other cementing material, which must be opened up with an acid to dissolve said materials and produce open porous strata through which the gas or oil may flow.

If a substance which is insoluble in acid has been used as a drilling mud it will frequently be driven into the spaces of such strata and hinder its opening up by the acid.

For this reason the weighting material of the drilling mud should be soluble in acid, to such an extent as to cause loosening of any "freeze" which may possibly be formed, by the use of acid.

The weighting material should be capable of adding sufficient weight to the mud and should aid the mud in holding down the gas or oil, but should at the same time, permit easy movement of the tools and free circulation, without addition of acids or alkalies to flocculate the mud sufficiently to make it circulate freely.

I have therefore compounded a drilling mud which avoids the faults outlined above, by using as weighting material a substance which constitutes the largest constituent of the earth's crust and without any chemical treatment, except a grinding to a suitable degree of fineness.

This material is limestone.

We mix therewith other natural earthen elements and so compound a material that will retain its natural composition under any normal or abnormal conditions encountered in drilling operations.

The chemical constitution of the natural limestone we have used is as follows:

| | |
|---|---|
| Calcium carbonate | 85.1 |
| Magnesium carbonate | 6.1 |
| Acid insoluble (silica, etc.) | 1.9 |
| Iron oxide | 4.2 |
| Aluminum oxide | 1.4 |
| Sulphur trioxide | 0.1 |
| Undetermined (alkalies, etc.) | 0.4 |
| Moisture and volatile impurities | 0.8 |
| | 100.0 |

Different beds of limestone vary in their composition, therefore the above analysis is not disclosed by way of limitation but only as an example. We propose to use any limestone which is easily available.

Instead of limestone any carbonate of the alkaline earth group of materials may be used, such as ($MgCO_3$); dolomite ($MgCO_3 \cdot CaCO_3$); barite ($BaCO_3$); or celestite ($SrCO_3$).

The limestone, or one of its substitutes named above, after it is finely ground, may be added to a clay suspension, and will give it weight, but will not increase its viscosity. The clay suspension may be the ordinary clay which is a mixture of a small proportion of colloidal matter with a large proportion of non-colloidal matter, or may be a suspension of a wholly colloidal clay such as bentonite, or may be a mixture of ordinary clay with suitable proportions of bentonite clay.

By selection of clay, or by mixing of different clays or by adding to clay the proper amount of bentonite, I produce a drilling mud of desired viscosity and I then adjust its weight by addition of a suitable amount of finely ground limestone, or mixtures of limestone and one or more of its equivalents named, I produce a drilling mud of proper viscosity and weight.

Instead of first preparing a suspension of clay, then adjusting its viscosity and weight I may prepare a mixture in dry form of all the components of the drilling mud in proportions which will produce the proper viscosity and weight and prepare a suspension of this mixture by the addition of the proper amount of water.

I prefer, however, to mix the ground limestone with volcanic ash finely pulverized, if necessary, to produce a mixture having about the following composition:

| | |
|---|---|
| Calcium carbonate | 70.63 |
| Magnesium carbonate | 5.06 |
| Acid insoluble (silica, etc.) | 13.50 |
| Iron oxide | 4.21 |
| Aluminum oxide | 3.12 |
| Calcium oxide | .16 |
| Magnesium oxide | .12 |
| Sulphur trioxide | .08 |
| Undetermined (alkalies, etc.) | 1.47 |
| Loss on ignition (moisture, etc.) | 1.62 |
| | 100.00 |

If bentonite or another substance is used instead of volcanic ash, the amount used will be such as to give the approximate composition given above.

However, it is understood that the compositions given are only illustrative and not limiting and materials yielding mixtures very widely different may be used, so long as the mud mixture has the properties above attributed to it.

By using a base material for compounding that has all the natural elements of its original composition, and comprising the largest percentage of the earth's structure, limestone, and blending it with other natural earthen elements, we compound a material that will retain its natural composition under any abnormal or normal conditions encountered in drilling processes.

Limestone with the proper amount of alumina ($Al_2O_3$) added will insure a compound that will give sufficient weight to drilling fluid to combat the average extreme high gas pressures, and because of its alumina content, of correct proportions, will also insure a sustained low viscosity drilling fluid.

Limestone and other elements used in compounding being non-affinitive to other elements encountered while drilling, will undergo the circulating process used in drilling, without losing any of its constituents in the course of circulation, and will return to the surface in the same quantities and precisely the same form as it was when it entered the well bore.

Alumina in its natural compounds, used in proper proportions in compounding adds a free flowing quality to the drilling fluid, and it will not be necessary to use sodium aluminate, sodium hydroxide or any destructive substances in order to hold the drilling fluid to a free fluid consistency.

A drilling mud of this nature will sustain its weight giving properties throughout the life of the drilling process, and will not precipitate out or cling to the walls of the bore hole to an excessive degree.

In commerce I propose either preparing and selling the complete mixture of clay, limestone or its equivalents, volcanic ash, and alumina, in dry condition, which, when mixed with water in suitable proportions, will give a drilling mud adapted for wells passing through determined strata.

I may also prepare and market the mixture of limestone and volcanic ash, or limestone and volcanic ash mixed with bentonite, or the mixture of limestone and volcanic ash and alumina in dry condition, in which case the purchaser will prepare a clay suspension of proper viscosity and adjust its weight by addition of suitable amounts of one of these mixtures.

We are not claiming a wall building mud for our product. For this we depend on the shales, gumbos, and other clays passed through while drilling, to produce enough wall building properties for walling up the hole through strata already penetrated.

Our aim and method is to specifically build a weight building mud of a high sustained quality and with the addition of aluminous material, to give this mud a free flowing quality.

It is obvious that various changes in details may be made without departing from the spirit of this invention which involves:

(a) The use of limestone as a basic element for compounding a drilling mud, for the use of controlling high gas pressure in the process of drilling for oil or gas.

(b) The use of limestone as a basic element for compounding a drilling mud, and the addition of sufficient alumina ($Al_2O_3$) in its naturally occurring compounds, in order to obtain a low viscosity drilling fluid, even at extremely high weights.

(c) The use of comminuted limestone in its natural chemical condition for compounding a drilling mud, and the addition of such elements as are necessary to produce a high sustained weight and a low sustained viscosity.

I am aware of the United States patent to Copelin, Number 1,411,164, dated March 28, 1924, which claims a method of solidifying soil in oil wells by the injection of calcium carbonate in the interstices of caving or loose strata of soil, but the mud he uses is not calcium carbonate as he says, but is waste lime from sugar factories.

It is a mixture of sucro-carbonate of lime and calcium, compounds of other acids found in sugar diffusion juices, such as phosphoric, sulfuric, hydrochloric, oxalic and tartaric acids, together with hydrolized proteins, pectins, and invert sugar.

It is not a drilling mud, proper, but is used to seal up porous portions of the soil. If it were mixed with water to form a mud, many of the substances named would dissolve. Moreover the patent describes its use only in terms which distinctly show its use as a plaster for the walls of the well.

Copelin's "drilling mud" has nothing in common with the composition I have invented.

Since certain changes may be made in the above article and different embodiments of the invention could be made without departing from the scope thereof, it is intended that all matter contained in the above description shall be interpreted as illustrative and not in a limiting manner.

It is also to be understood that the following claims are intended to cover all the generic and specific features of the invention herein described and all statements of the scope of the invention which as a manner of language might be said to fall therebetween, and that they are intended to be inclusive in scope and not exclusive, in that if desired other materials may be added to my novel composition of matter herein claimed without departing from the spirit of the invention. Particularly it is to be understood that in said claims ingredients or components recited in the singular are intended to include compatible mixtures of said ingredients wherever the sense permits.

I claim:

1. The process of manufacturing a drilling mud which comprises preparing a suspension of clay, adjusting its viscosity to the desired degree, and adding comminuted material chosen from the naturally occurring carbonates of the metals of the alkaline earth group mixed with volcanic ash to adjust the weight to the desired amount.

2. The process of manufacturing a drilling mud, which comprises preparing a suspension of clay, mixing therewith sufficient bentonite to produce the desired viscosity, and adjusting its weight to the desired amount by the addition of a suitable amount of comminuted material chosen from the naturally occurring carbonates of the metals of the alkaline earth group mixed with volcanic ash.

3. The process of manufacturing a drilling mud which comprises preparing a suspension of clay, mixing therewith sufficient alumina containing material to produce the desired viscosity and adjusting its weight to the desired amount by the addition of a suitable amount of comminuted material chosen from the naturally occurring carbonates of the alkaline earth metals.

4. A composition of matter for the manufacture of drilling mud comprising bentonite, material chosen from the comminuted naturally occurring carbonates of the metals of the alkaline earth metals and volcanic ash, the material chosen from the carbonates of the alkaline earth metals constituting at least 70% of the dry material exclusive of the bentonite.

JAMES F. LARKIN.